J. W. KOHLHEPP.
CARCASS DEHAIRING WHEEL.
APPLICATION FILED AUG. 25, 1920.
1,367,057.
Patented Feb. 1, 1921.
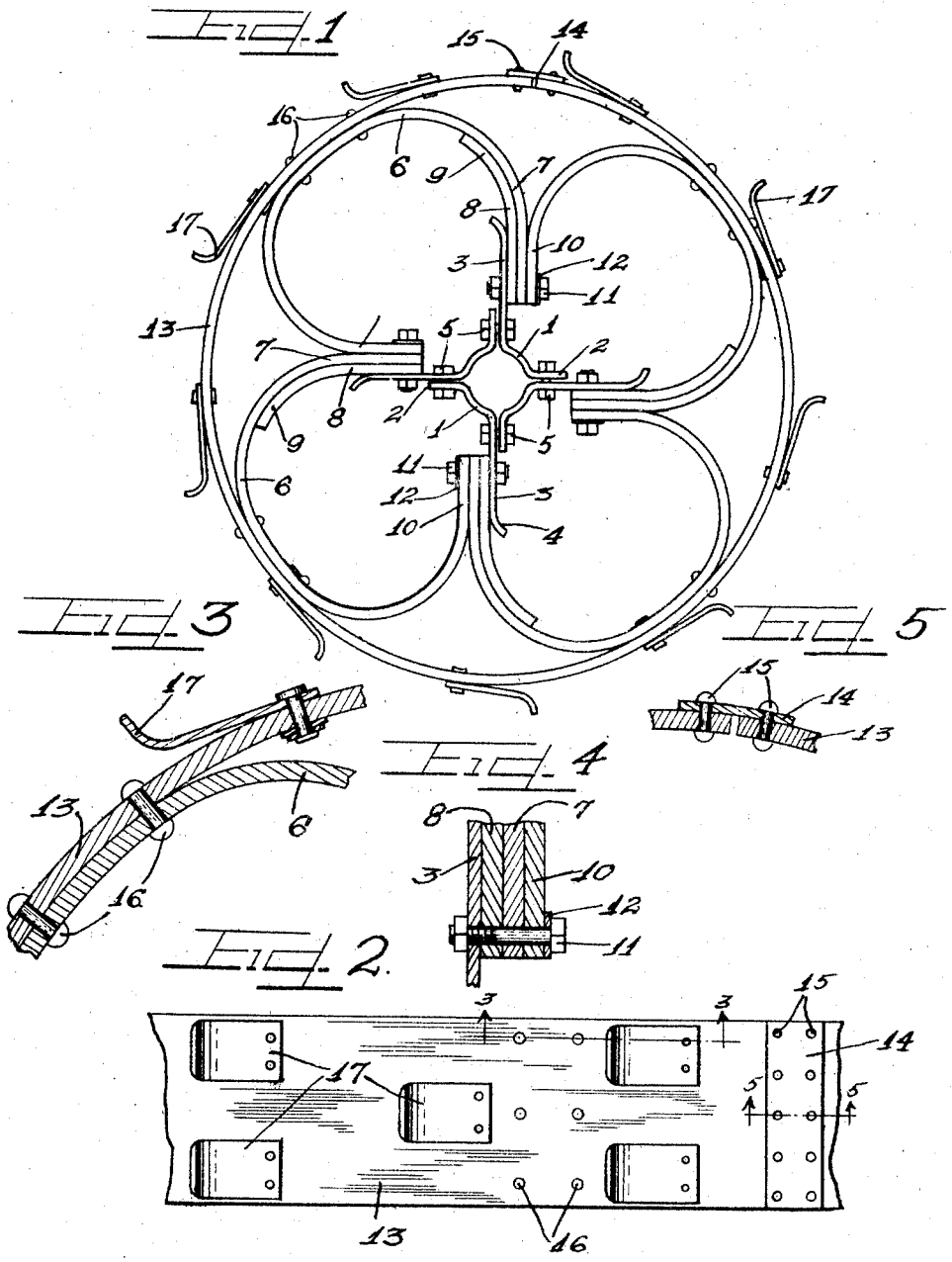

UNITED STATES PATENT OFFICE.

JOHN W. KOHLHEPP, OF CHICAGO, ILLINOIS, ASSIGNOR TO ALLBRIGHT-NELL COMPANY, A CORPORATION OF ILLINOIS.

CARCASS-DEHAIRING WHEEL.

1,367,057.                     Specification of Letters Patent.      Patented Feb. 1, 1921.

Application filed August 25, 1920. Serial No. 405,885.

*To all whom it may concern:*

Be it known that I, JOHN W. KOHLHEPP, a citizen of the United States, and a resident of the city of Chicago, in the county of Cook and State of Illinois, have invented certain new and useful Improvements in Carcass-Dehairing Wheels; and I do hereby declare that the following is a full, clear, and exact description of the same, reference being had to the accompanying drawings, and to the numerals of reference marked thereon, which form a part of this specification.

This invention particularly pertains to an improved type of a carcass dehairing wheel wherein a flexible scraper carrying rim is secured to the bights of flexible looped spoke members which are not only secured to one another but to hub members as well.

It is an object of this invention to provide a flexible dehairing rim with flexible looped spoke members.

A further object of the invention is to provide a carcass dehairing device wherein the scraping blades are adapted to be secured to a rim member attached to connected looped spokes.

It is an important object of this invention to construct a flexible carcass dehairing device of simple and effective construction, and having the scraper blades secured to a flexible rim supported by looped flexible spoke members, the ends of which are not only secured to the ends of others of said spoke members but to different arms of a mounting spider.

Other and further important objects of this invention will be apparent from the disclosures in the drawings and specification.

The invention (in a preferred form) is illustrated in the drawings and hereinafter more fully described.

On the drawings:

Figure 1 is a side elevation of a flexible dehairing wheel embodying the principles of this invention.

Fig. 2 is a plan view of a fragmentary portion of the wheel rim.

Fig. 3 is an enlarged detail section taken on line 3—3 of Fig. 2.

Fig. 4 is a fragmentary detail section through the ends of two adjacent spoke members to illustrate the method of attachment to the wheel spider.

Fig. 5 is an enlarged detail section taken on line 5—5 of Fig. 2.

As shown on the drawings:

The improved flexible wheel of this invention comprises a mounting hub or spider adapted to be removably secured upon a shaft and embracing a plurality of similarly constructed castings or sections. Each of the spider sections comprises a curved body portion 1, having an apertured short straight arm 2 integral with one end thereof, and an apertured long arm 3 integral with the other end. The outer end of each arm 3 is curved at 4. The short and the long arms 2 and 3 of adjacent spider sections are removably secured together by bolts 5 or other suitable means.

The spokes of the wheel each comprises a strip of fabric or other flexible material looped to provide a bight or curved portion 6. One end of each looped spoke is turned inwardly to afford an advance arm 7, adjacent the inner surface of which is disposed a flexible reinforcing strip 8, made of fabric or other suitable material. The outer end of each reinforcing strip 8 is curved at 9 to conform to the curvature of the bight of the looped spoke. The other end of each looped spoke is bent inwardly to form a trailing arm 10.

As illustrated in Fig. 1, when assembled the trailing arm 10 of one flexible spoke is disposed adjacent the outer surface of the advance arm 7 of an adjacent spoke. The reinforcing strip 8 of said second mentioned looped spoke is positioned between the advance arm 7 and one of the mounting spider long arms 3. The various members 3, 8, 7 and 10 are provided with apertures which register with one another when said members are assembled as described. Bolts 11 and washers 12 are used to removably hold the flexible spoke arms and the reinforcing strips secured to the mounting spider arms 3 as illustrated in Fig. 4.

A strip of fabric or other flexible material is engaged around the flexible wheel spokes to afford a flexible wheel rim 13, the adjacent ends of which are secured together by means of a connecting or tie plate 14 and rivets 15. The flexible wheel rim 13 is secured to the bights of the various looped spokes 6 by rivets 16 or other means. Rigidly secured on the outer surface of the flexible wheel rim 13 are a plurality of staggered outwardly curved scraper blades 17.

The trailing arm 10 of one spoke and the reinforcing strip 8 and the advance arm 7 of another spoke form an inwardly directed or radial mounting arm adapted to be removably attached or connected with any suitable type of a mounting hub or spider other than that illustrated and described.

If desired, the looped spokes 6 may be made of rigid material with the rim 13 of flexible material, or the looped spokes may be made of flexible material and the wheel rim 13 of a rigid material.

I am aware that numerous details of construction may be varied through a wide range without departing from the principles of this invention, and I therefore do not purpose limiting the patent granted otherwise than necessitated by the prior art.

I claim as my invention:

1. A carcass dehairing wheel comprising a plurality of looped spoke members secured to one another, and a dehairing rim secured to the bights of said looped spoke members.

2. A carcass dehairing wheel comprising a plurality of looped spoke members secured to one another, a rim member secured to said spoke members, and scraping blades on said rim member.

3. A carcass cleaning wheel comprising a plurality of looped spoke members, a rim secured to the bights of said spoke members, scraping blades on said rim, reinforcing strips engaged against the inner surface of the advance ends of said spoke members, and means for removably holding the trailing end of one spoke member to the reinforcing strip and advance end of another spoke member.

4. In a carcass dehairing wheel the combination with a mounting spider, of a plurality of looped spokes connected to one another and to said spider, a rim member secured to the bights of said spokes, and blades secured on the outer surface of said rim member.

5. A carcass dehairing wheel embracing a mounting spider, a plurality of looped spokes, reinforcing strips engaged against the inner surface of the advance ends of said spokes, means for removably holding the trailing end of one spoke and the reinforcing strip and advance end of another spoke to said spider, a rim engaged around the looped spoke, and cleaning blades on said rim.

6. A carcass cleaning wheel embracing a plurality of looped flexible members secured to one another, and a flexible cleaning rim secured to all of said looped flexible members.

7. A cleaning device embracing a plurality of looped flexible members secured to one another, flexible reinforcing members secured to said looped members, a flexible rim secured to said looped members, and blades secured on said rim.

8. A carcass cleaning device comprising a plurality of looped flexible spokes, flexible reinforcing strips therein, a mounting spider, means for removably securing the trailing end of one spoke and the advance end and reinforcing strip of another spoke to said spider, a rim secured to the bights of said looped spokes, and cleaning blades on said rim.

9. A carcass dehairing wheel comprising a flexible rim, scrapers secured to the outer surface thereof, and a plurality of reinforced looped supporting members for said rim secured to one another and to the rim.

In testimony whereof I have hereunto subscribed my name in the presence of two subscribing witnesses.

JOHN W. KOHLHEPP.

Witnesses:
FRED E. PRESSLER,
CARLTON HILL.